(12) United States Patent
Liu

(10) Patent No.: US 7,221,563 B2
(45) Date of Patent: May 22, 2007

(54) DISPLAY WITH INTEGRATED ELECTRONIC DEVICE

(75) Inventor: Yen-Pan Liu, Taipei (TW)

(73) Assignee: Hannspree Inc., Taipei (TW)

( * ) Notice: Subject to any disclaimer, the term of this patent is extended or adjusted under 35 U.S.C. 154(b) by 251 days.

(21) Appl. No.: 11/036,943

(22) Filed: Jan. 14, 2005

(65) Prior Publication Data

US 2006/0077625 A1 Apr. 13, 2006

(30) Foreign Application Priority Data

Oct. 7, 2004 (TW) .............................. 93215922 U

(51) Int. Cl.
*G06F 1/16* (2006.01)
(52) U.S. Cl. ...................... 361/681; 361/682
(58) Field of Classification Search ......... 361/681–682
See application file for complete search history.

(56) References Cited

U.S. PATENT DOCUMENTS 5,414,444 A * 5/1995 Britz .......................... 345/156
2005/0091431 A1* 4/2005 Olodort et al. ............... 710/72

* cited by examiner

*Primary Examiner*—Yean-Hsi Chang
(74) *Attorney, Agent, or Firm*—Thomas, Kayden, Horstemeyer & Risley

(57) ABSTRACT

A display with integrated electronic devices. An device module rotatably connected to a main body of the display, comprises a module body is rotatably connected to the main body capable of moving between a first position and a second position, a first electronic device disposed on the module body, and a second electronic device disposed on the module body. The first electronic device is exposed when the module body is in the first position, and the second electronic device is exposed when the module body is in the second position.

9 Claims, 7 Drawing Sheets

DISPLAY WITH INTEGRATED ELECTRONIC DEVICE

BACKGROUND

The invention relates to a display, and in particular to a display with integrated electronic devices.

A typical display with integrated speakers is shown in FIG. 1. The display 100 comprises a main body 10 and speakers 20 attached to opposite sides of the main body 10. The speakers 20, however, occupy considerable space when the display 100 is not used.

SUMMARY

A display according to an embodiment of the invention comprises a main body and a device module rotatably connected to the main body. The device module comprises a module body, a first electronic device and a second electronic device. The module body rotatably connects to the main body, capable of rotating between a first position and a second position. The first electronic device and second electronic device are disposed on the module body. The first electronic device is exposed when the module body is in the first position, and the second electronic device is exposed when the module body is in the second position.

When the module body is in the first position, the module body overlaps the main body with the first electronic device exposed. When the module body is in the second position, the module body is aligned with the main body with the second electronic device exposed.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
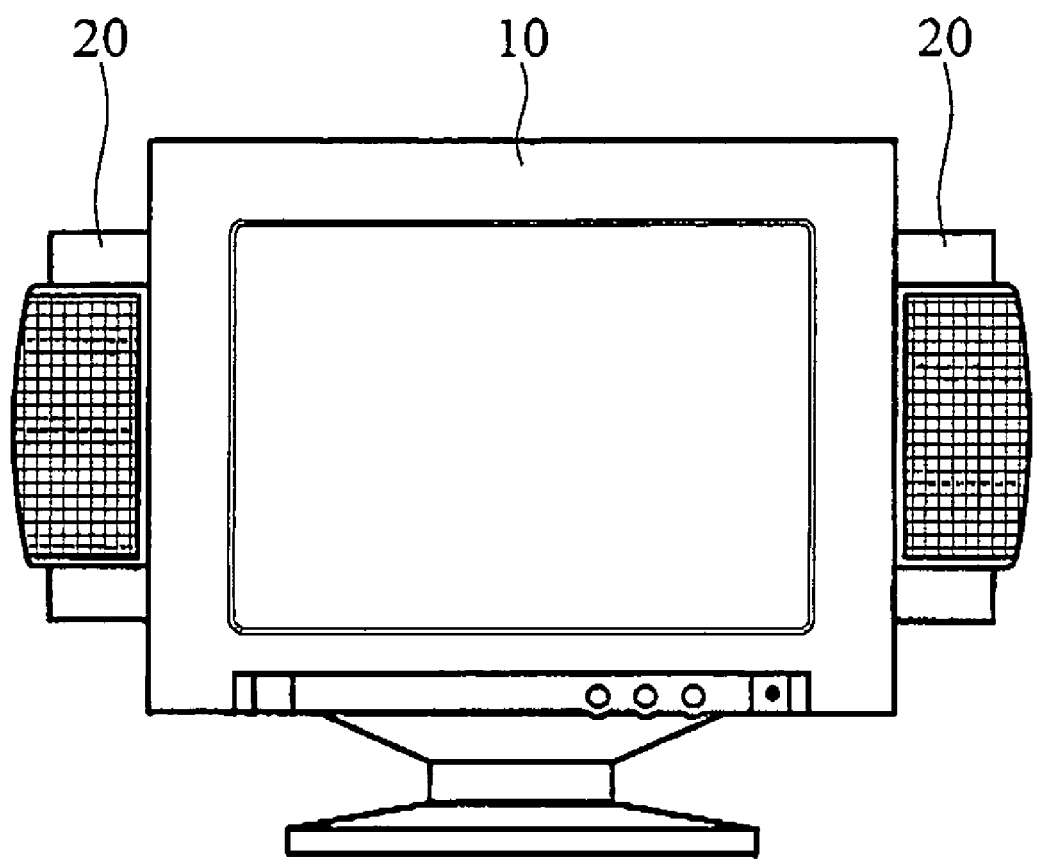
FIG. 1 is a schematic view of a conventional display.
Figure 2:
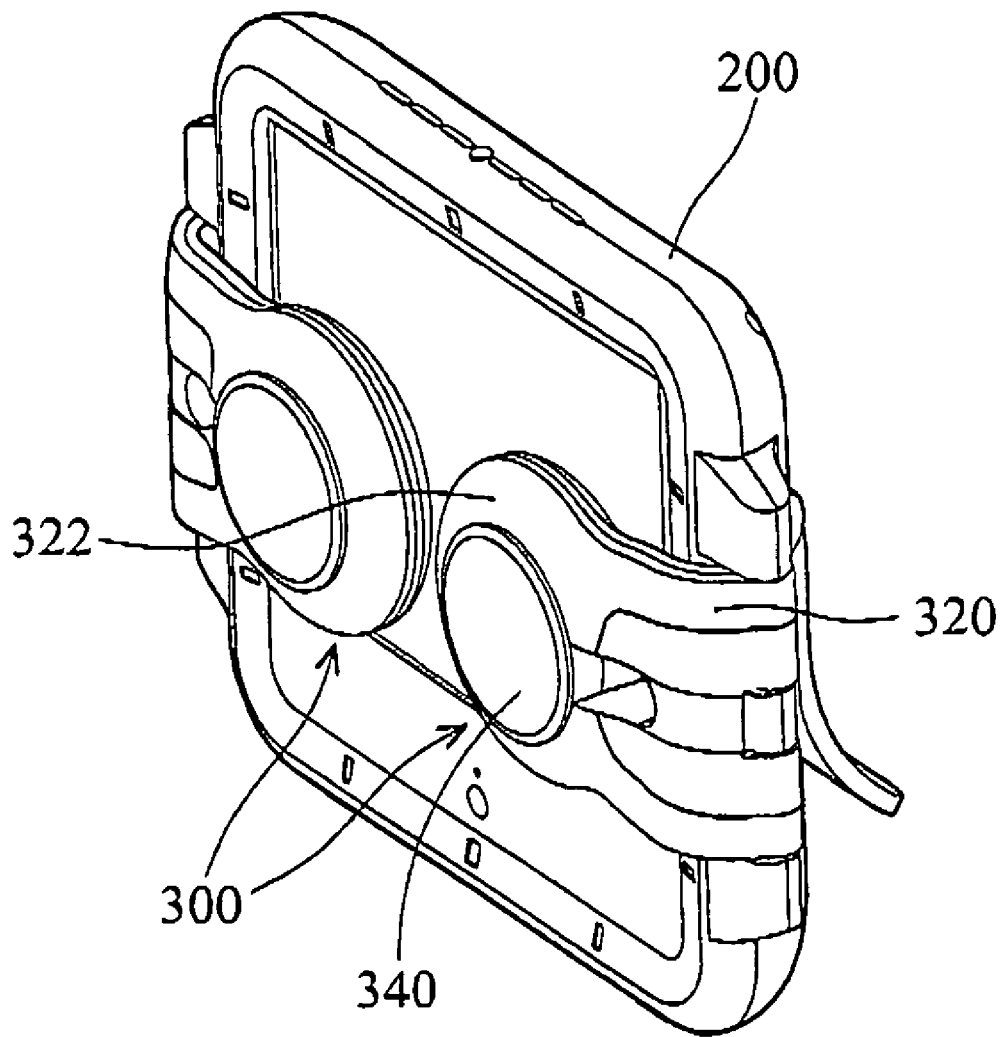
FIG. 2 is a perspective view of a display according to an embodiment of the invention.
Figure 3:
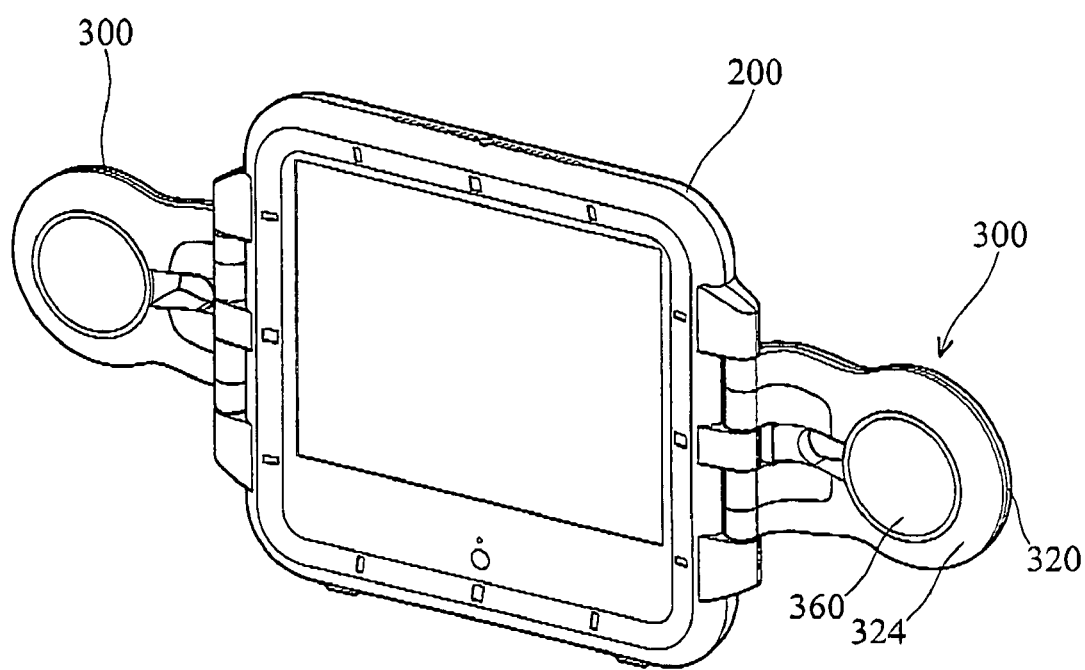
FIG. 3 is another perspective view of a display according to an embodiment of the invention.

FIGS. 2 and 3 depict an embodiment of a display 1000 comprising a main body 200 and two device modules 300 rotatably connected to the right and the left sides of the main body 200 respectively. Each device module 300 can rotate between a first position and a second position. In FIG. 2, each device module 300 is in the first position to overlap the main body 200. In FIG. 3, each device module 300 is in the second position to be aligned with the main body 200.

The device module 300 comprises a module body 320, a first electronic device 340 and a second electronic device 360. The module body 320 is flat and comprises a first surface 322 on one side thereof and a second surface 324 on another side thereof, opposite to the first surface 322. The first electronic device 340 is disposed on the first surface 322 and the second electronic device 360 is disposed on the second surface 324. For example, the first electronic device 340 is a timer (clock) and the second electronic device 360 is a speaker. When the device module 300 is in the first position as shown in FIG. 2, the first electronic device 340 is exposed, whereby the timer can be used. When the device module 300 is in the second position as shown in FIG. 3, the second electronic device 360 is exposed, whereby the speaker can be used. Accordingly, when the display 1000 is not used, the device module 300 can overlap the main body 200, such that the timer is exposed and can be used. When the display 1000 is to be used, the device module 300 is lifted and the speaker is exposed.

Figure 4:
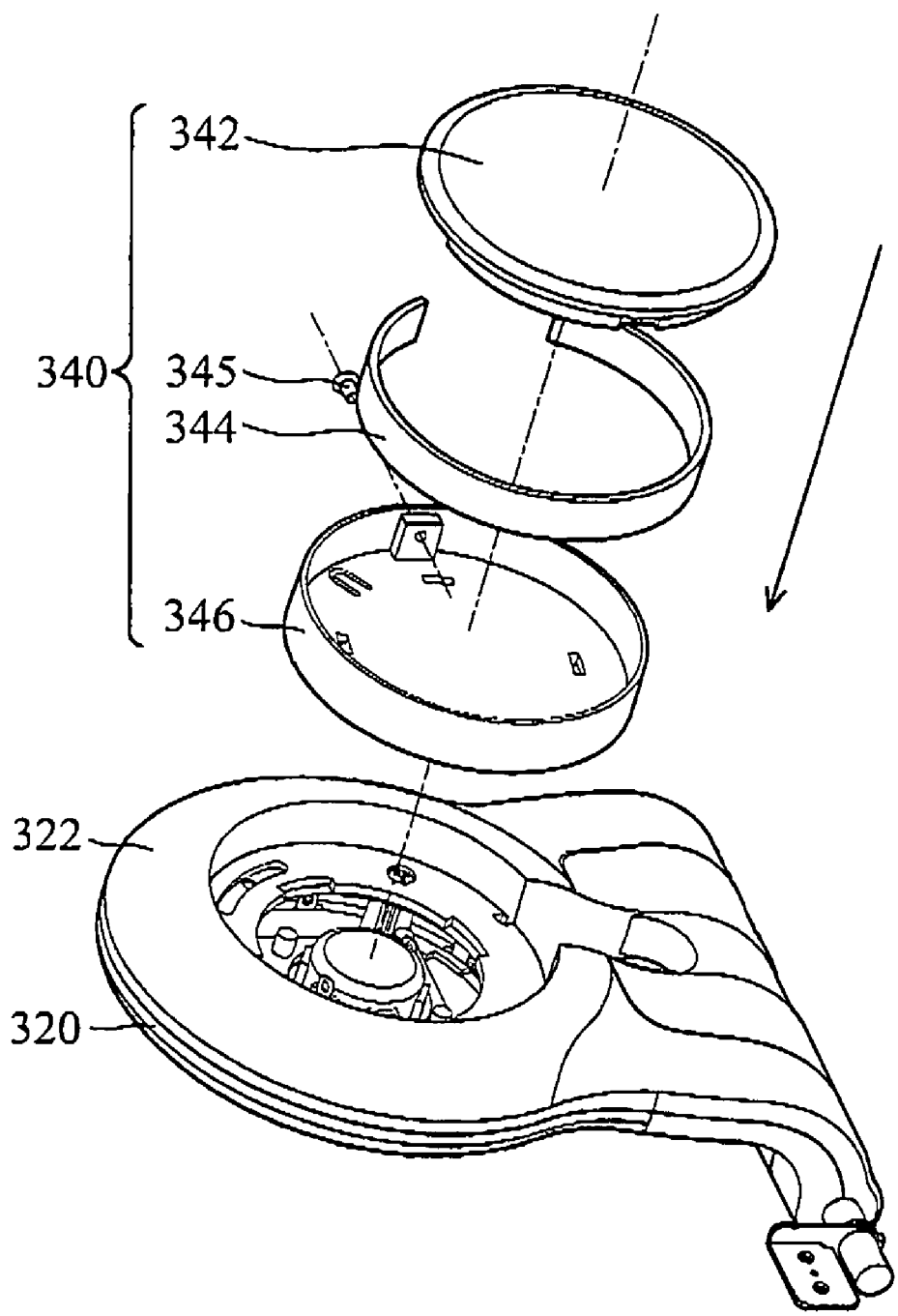
FIG. 4 is an exploded view of a device module according to an embodiment of the invention.

In FIG. 4, the first electronic device 340 comprises a body 342, a first elastic member 344 and a base 346, wherein the first elastic member 344 is a rubber strip closely fitted between the body 342 and the base 346 when the body 342 is pressed into the base 346. The elasticity of the rubber strip secures the base 346 to the body 342. In addition, to increase reliability of positioning, a bolt 345 screwed into the base 346 abuts the body 342.

Figure 5A:
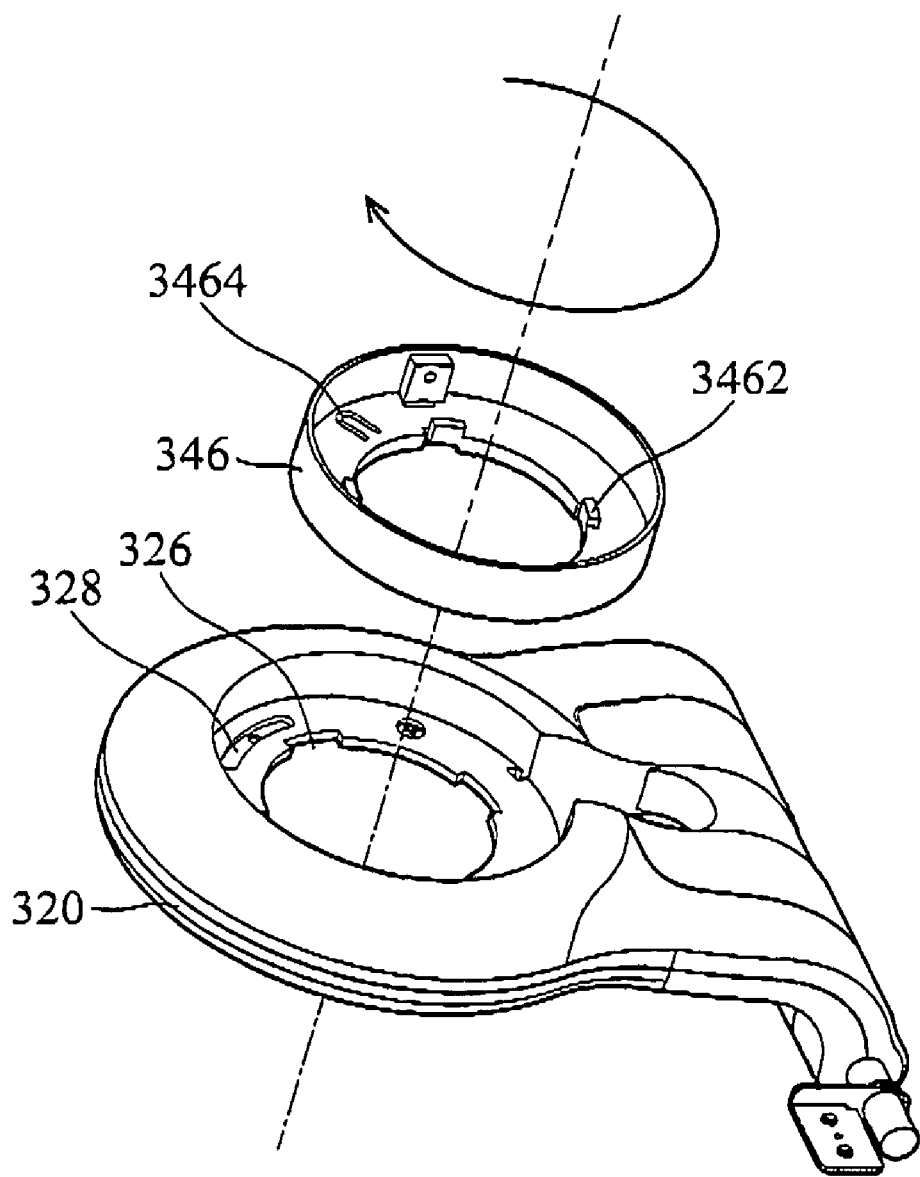
FIG. 5a is a perspective view depicting a module body and a base according to an embodiment of the invention.
Figure 5B:
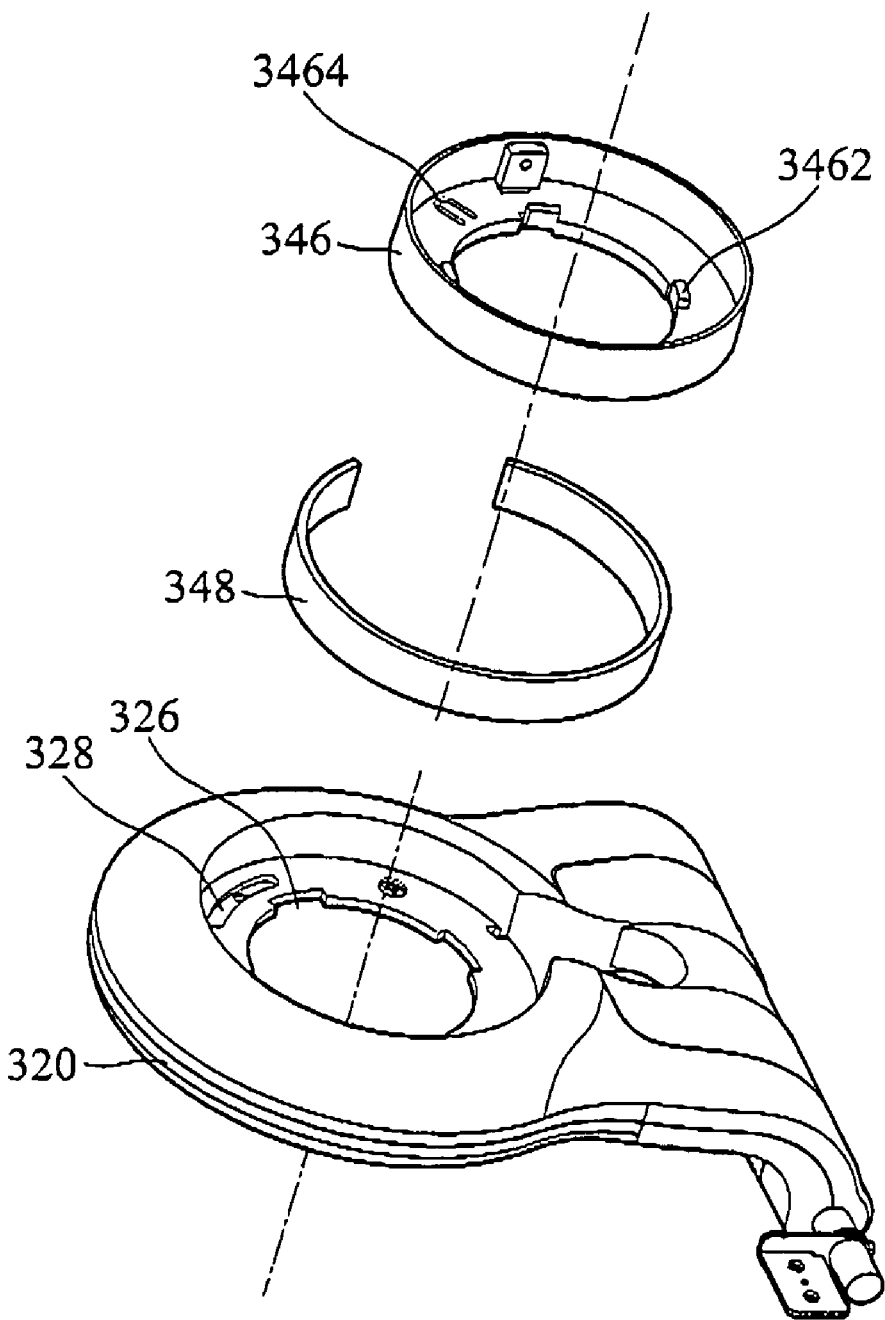
FIG. 5b is a perspective view depicting a module body and a base according to an embodiment of the invention.
Figure 6:
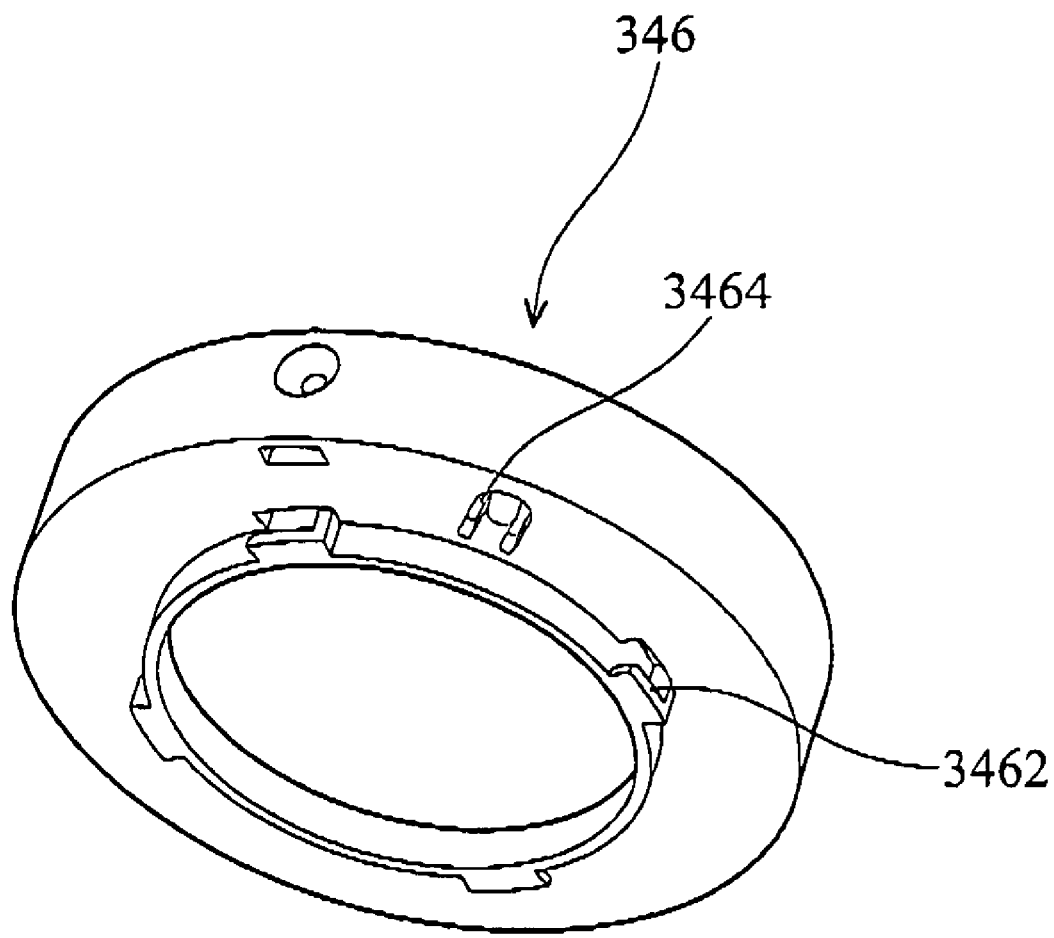
FIG. 6 is a perspective view of a base according to an embodiment of the invention.

In FIGS. 5a and 6, a plurality of latches 3462 and a protrusion 3464 are disposed on the bottom of the base 346. A plurality of notches 326 and a groove 328 corresponding to the latches 3462 and protrusion 3464 respectively are defined on the module body 320. When the base 346 is disposed in the module body 320, the protrusion 3464 enters the groove 328 and the latches 3462 engage the notches 326. As the latches 3462 are L-shaped, rotation of the base 346 makes the latch 3462 engage the edges of the notch 326, thereby positioning the base 346 to the module body 320. In addition, a second elastic member 348 is disposed around the base 346, as shown in FIG. 5b, closely fitted between the base 346 and the module body 320 to secure the base 346 to the module body 320.

The speakers of the display of the invention can be hid to save space, and various electronic devices can be integrated for wide applications.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display with integrated electronic devices, comprising:
    a main body; and
    a device module rotatably connecting to the main body and comprising:
        a module body rotatably connecting to the main body between a first position and a second position;
        a first electronic device disposed on the module body and comprising a body and a positioning mechanism joined thereto, the positioning mechanism comprising a base and a first elastic member disposed between the body and the base, whereby the base is joined with the body; and
        a second electronic device disposed on the module body, wherein the first electronic device is exposed when the module body is in the first position, and the second electronic device is exposed when the module body is in the second position.

2. The display with integrated electronic devices as in claim 1, wherein the module body comprises a first surface on which the first electronic device is disposed and a second surface on which the second electronic device is disposed.

3. The display with integrated electronic devices as in claim 2, wherein when the module body is in the first position, the module body overlaps the main body with the first surface exposed.

4. The display with integrated electronic devices as in claim 2, wherein when the module body is in the second position, the module body is aligned with the main body with the second surface exposed.

5. The display with integrated electronic devices as in claim 2, wherein the first surface and the second surface are opposing.

6. The display with integrated electronic devices as in claim 1, wherein the first elastic member is a rubber strip closely fitted between the body and the base.

7. The display with integrated electronic devices as in claim 1, wherein the module body comprises a plurality of notches, and the base comprises a plurality of latch members corresponding to and engaging the notches, whereby the base is positioned to the module body.

8. The display with integrated electronic devices as in claim 1, wherein the module body further comprises a groove, and the base further comprises a protrusion entering the groove when the base is positioned to the body.

9. The display with integrated electronic devices as in claim 1, wherein the positioning mechanism further comprises a second elastic member closely fitted between the base and the module body when the base is joined with the module body.

* * * * *